Patented Aug. 25, 1953

2,650,218

UNITED STATES PATENT OFFICE 2,650,218

ESTERS OF PENICILLIN FROM ACTIVE HALOGEN COMPOUNDS

Harold F. McDuffie, Jr., Oak Ridge, Tenn., and Douglas E. Cooper, Syracuse, N. Y., assignors to Bristol Laboratories Inc., Onondaga County, N. Y., a corporation of New York No Drawing. Application April 11, 1952,
Serial No. 281,894

3 Claims. (Cl. 260—239.1)

This invention relates to esters of penicillin and to methods for their production through the reaction of penicillin salts with certain substituted alkyl halides.

The compounds of the present invention have the following general formula:

$$\text{Pen—COO—CH—X}$$
$$|$$
$$Y$$

where Pen-COO represents a penicillin with the hydrogen atom removed from the carboxyl group, X represents a radical which contains, at the point of its attachment to the carbon atom, a —CO—, —CN, or —O—linkage. Y represents hydrogen, an aryl group and X.

The structure of penicillin is now well known to the art. For purposes of this invention, it is considered to include compounds having the characteristic bi-cyclic ring system of a $\beta$-lactam fused to a thiazolidine carboxylic acid, and showing antibiotic activity.

Heretofore, a small number of the simpler esters of penicillin have been obtained by use of the reaction of penicillin with diazomethane and its homologs or derivatives. Such esters include methyl, ethyl, butyl, benzyl, and benzohydryl. None of these has shown any therapeutic activity in man, however, since these esters are substantially inactive for the reason that hydrolysis to penicillin in the body proceeds too slowly to be observed.

In accordance with the present invention, esters of penicillin have been prepared which, upon oral or parenteral administration in suspensions in oil or water, release penicillin at substantial rates and have been found to be useful and valuable therapeutic agents.

The esters of this invention may be produced by reacting the sodium or other salt of penicillin with a member of a certain class of alkyl halides commonly referred to as "active halides." Examples of specific types of such active halides are:

Cl—CH$_2$—CO—CH$_3$
Cl—CH$_2$—CO—C$_2$H$_5$
Cl—CH$_2$—CO—C$_3$H$_7$
Cl—CH$_2$—CO—C$_6$H$_5$
Cl—CH$_2$—CO—C$_6$H$_4$—C$_6$H$_5$
Cl—CH$_2$—CO—C$_6$H$_4$—CH$_3$
Cl—CH$_2$—CO—C$_6$H$_4$—Br
Cl—CH$_2$—CO—NH$_2$
Cl—CH$_2$—CO—NH—CH$_3$
Cl—CH$_2$—CO—NH—C$_2$H$_5$
Cl—CH$_2$—CO—N(CH$_3$)$_2$
Cl—CH$_2$—CO—N(C$_2$H$_5$)$_2$
Cl—CH$_2$—CO—N(CH$_3$)—C$_2$H$_5$
Cl—CH$_2$—O—CO—CH$_3$
Cl—CH$_2$—O—CO—C$_2$H$_5$
Cl—CH$_2$—O—CO—C$_3$H$_7$
Cl—CH$_2$—O—CO—C$_6$H$_5$
Cl—CH$_2$—O—CO—C$_6$H$_4$—CH$_3$
Cl—CH$_2$—O—CO—C$_6$H$_4$—O—CH$_3$
Cl—CH$_2$—CO—O—CH$_3$
Cl—CH$_2$—CO—O—C$_2$H$_5$
Cl—CH$_2$—CO—O—C$_3$H$_7$
Cl—CH$_2$—CO—O—C$_6$H$_5$
Cl—CH(CO—O—C$_2$H$_5$)$_2$
Cl—CH$_2$—CN
Cl—CH$_2$(CN)—C$_6$H$_5$
Cl—CH$_2$—O—CH$_3$
Cl—CH$_2$—O—C$_2$H$_5$
Cl—CH$_2$—O—C$_6$H$_5$

These compounds are all characterized by high reactivity toward nucleophilic reagents in the second order displacement reaction. Organic reaction theory indicates that the carbon atom bearing the halogen has been "activated" by the attached group and, as a result, bears a small increment of positive charge which facilitates the access of the nucleophilic reagent (base) and thus lowers the activation energy of the reaction.

The alkyl halides which are used to produce the penicillin esters of this invention fall into several sub-classes:

| Sub-Class | Illustrative Compound |
|---|---|
| 1. 2-oxo-alkyl halides | Cl—CH$_2$—CO—CH$_3$ |
| 2. 1-carboxamido alkyl halides | Cl—CH$_2$—CO—NH$_2$ |
| 3. 1-acyloxy alkyl halides | Cl—CH$_2$—O—CO—CH$_3$ |
| 4. 1-carbalkoxy alkyl halides | Cl—CH$_2$—CO—O—C$_2$H$_5$ |
| 5. 1-cyano alkyl halides | Cl—CH$_2$—CN |
| 6. 1-alkoxy alkyl halides | Cl—CH$_2$—O—CH$_3$ |
| 7. 1-aryloxy alkyl halides | Cl—CH$_2$—O—C$_6$H$_5$ |

It will be understood that other halides (bromides and iodides) may be used in place of the alkyl chlorides listed above. Because of the hazards surrounding the use of fluorine compounds, it has been found advantageous to use one of the other halides. Also other penicillin salts (calcium, potassium, ammonium, etc.) may be used instead of the sodium salt.

The following examples will serve to illustrate the invention:

*Example 1.—Penicillin acetonyl ester:*

Pen COONa + ClCH$_2$COCH$_3$ →

Pen—COO—CH$_2$COCH$_3$

Chloroacetone (4.7 ml.) was added to a cold swirling solution of 20 g. sodium penicillin in 100 ml. acetyldimethylamine. The solution was allowed to stand in the refrigerator overnight. Slow addition of the reaction mixture to 1,000 ml. of neutral buffer precipitated the ester in somewhat oily conditions, but after the mixture had been kept cold for a few hours this material was transformed to a flocculent precipitate of white crystals. The solid was filtered, washed with water, and dried in vacuo; yield 15.2 g. For recrystallization it was dissolved in 450 ml. of isopropyl alcohol, diluted with water just to the point of incipient turbidity (about 1,000 ml. water), and the solution stored in the refrigerator. On the next day the white crystals were filtered off, washed with 25% isopropanol and dried; yield 10.97 g. (50%); M. P. 92°. For assay 10.2 mg. was dissolved in 20 ml. isopropanol and diluted to 100 ml. with neutral buffer; iodometric 1300 units/mg., S. aureus 1430 units per mg. (theory=1520). Because aqueous solutions of this ester undergo hydrolysis at a substantial rate, it is not determined what proportion of the activity shown against S. aureus may be due to unhydrolyzed ester as compared with free penicillin released during the incubation of the assay plate.

Analysis:

|   | Calculated | Found |
|---|---|---|
| C | 58.4 | 57.9 |
| H | 5.68 | 5.65 |

Example 2.—Penicillin phenacyl ester:

Pen COONa + C₆H₅COCH₂Br $\xrightarrow{\text{HCONMe}_2}$

Pen COOCH₂COC₆H₅

A nearly pure grade of sodium penicillin G (100 g.) was dissolved in 500 ml. dimethylformamide. Addition of 56 g. of phenacyl bromide released considerable warmth. After storage in the refrigerator overnight, the solution was poured into a mixture of 500 ml. benzene and 2500 ml. neutral buffer. The benzene layer was separated and combined with another 500 ml. extract of the aqueous layer, then dried over sodium sulfate. Skellysolve D was then added to the point of incipient turbidity, and the solution was let stand one hour. An excellent crop of white crystals, weighing approximately 60 g. separated. A second addition of Skellysolve D to the cloud point produced another crop of about the same amount, but slightly tan in color. The third addition gave a white product again but in smaller quantity. Still slightly wet with benzene, the combined crops were dissolved in 250 ml. acetone; the solution was diluted with Skellysolve D and stored in the refrigerator overnight. The colorless needles which separated were washed with a 1:2 mixture of acetone and Skellysolve D and the solution was diluted with Skellysolve D, and dried; yield 44 g.; M. P. 136–136.5°.

Analysis:

|   | Calculated | Found |
|---|---|---|
| C | 63.7 | 63.8 |
| H | 5.35 | 5.51 |

For assay 8.52 mg. was dissolved in 35 ml. absolute ethanol and the solution diluted to 100 ml. with neutral buffer; iodometric 1362 units/mg. (theory=1320); S. aureus 221 units/mg. As with the acetonyl ester and other esters of this group the facility of hydrolysis leaves it uncertain (though unimportant) what preparation of the activity against bacteria is due to intact ester.

Example 3.—Penicillin p-bromophenacyl ester:

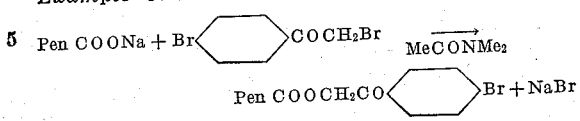

A cold solution of 1 g. sodium penicillin G in 10 ml. acetyldimethylamine was treated with 0.65 g. p-bromophenacyl bromide, and the solution kept in the refrigerator overnight. Dilution with 150 ml. neutral phosphate buffer produced a solid white precipitate which was filtered off, washed with water, then dried in vacuo; yield 0.57 g. (46%). For assay 50 ml. was dissolved in ethanol and the solution diluted with a small amount of neutral buffer; Iodometric assay: 1050 units/mg. (theory=1100). It was recrystallized from a supersaturated soltuion prepared by adding water to an isopropanol solution to the point of incipient turbidity.

Analysis: Calculated for C₂₄H₂₃N₂O₅Br.

|   | Calculated | Found |
|---|---|---|
| N | 5.3 | 5.6 |

Example 4.—p-Phenylphenacyl ester:

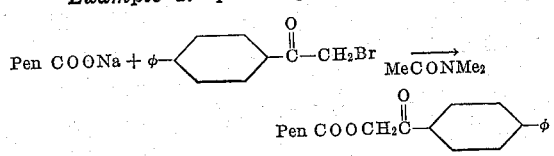

To a chilled solution of 1 g. sodium penicillin in 10 ml. acetyldimethylamine was added 0.55 g. p-phenylphenacyl bromide, and the solution was stored overnight in the refrigerator. Addition of the reaction mixture to 10 volumes of buffer precipitated the ester as a white solid. It was filtered off, washed with water, then dried in vacuo. The material later became gummy, but when rubbed with isopropyl alcohol the mass disintegrated into white crystals. The dry solid weighed 0.64 g. (M. P. 105°–113°). This was dissolved in 8 ml. benzene, and the solution centrifuged to separate inorganic impurities. Addition of 6 ml. cyclohexane produced a faint turbidity in the solution, from which colorless crystals separated when it was stored in the cold overnight; yield 0.43 g. (67%); M. P. 120.5–22°. It was difficult to obtain an accurate iodometric assay on this compound because of its insolubility even in highly alcoholic aqueous solutions. The best value was 546 units/mg. (theory=1120). The S. aureus assay showed 37.6 units/mg., indicating either a very slow rate of hydrolysis, or destruction by the necessarily high alcoholic content of the solution.

Analysis:

|   | Calculated | Found |
|---|---|---|
| C | 68.2 | 68.3 |
| H | 5.34 | 5.48 |

Example 5.—Penicillin carboxamidomethyl ester:

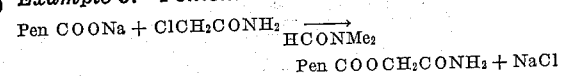

A solution of 40 g. sodium penicillin and 10.5 g. chloracetamide in 200 ml. dimethylformamide was allowed to stand two days at room temperature. The end of the reaction is marked by clearing of the liquid suspended sodium chloride, which finally forms a white layer in the flask bottom. Enough of the solution to produce a faint turbidity was added to 2000 ml. buffer and seed crystals, obtained by rubbing the oil produced in a similar but smaller scale experiment, were introduced. Slow addition of the remainder of the dimethylformamide solution with stirring was then resumed. After addition was complete stirring was continued five minutes longer; the crystals were filtered off and washed with buffer then water; yield 12.9 g. (29%). For assay 9.46 mg. was dissolved in 7 ml. isopropanol and the solution diluted to 50 ml. with buffer; iodometric 1450 units/mg. (theory=1520). Solution of 12.8 ml. in the 400 ml. acetone, followed by dilution to the turbid point with Skellysolve D (500 ml.) produced on standing 9.55 g. crystals; M. P. 165–7° (dec.). This compound is soluble in most organic solvents including benzene, but it is only slightly soluble in water.

Analysis: Calculated for $C_{18}H_{21}N_3O_6S$

|   | Calculated | Found |
|---|---|---|
| C | 55.2 | 55.2 |
| H | 5.41 | 5.52 |

*Example 6.—Penicillin carbethoxymethyl ester:*

Pen COONa + CH$_2$BrCOOC$_2$H$_5$ $\xrightarrow{HCONMe_2}$

Pen COOCH$_2$COOC$_2$H$_5$ + NaBr

A solution of 16 g. sodium penicillin G and 4.5 g. ethyl alphabromoacetate in 150 ml. dimethylformamide was allowed to stand at room temperature 12 hours. The reaction solution was then fed slowly over an hour period into 1500 ml. buffer, with stirring. The precipitate was somewhat gummy; stirring was continued overnight. Next day, the white crystalline solid was filtered off, washed with buffer, then water, and dried in vacuo; yield, 14.1 g. (80%). For recrystallization, 14 g. was dissolved in 350 ml. ether and the solution filtered from inorganic impurities. Addition of 120 ml. of Skellysolve D produced a faint turbidity; the solution was seeded and allowed to stand at room temperature for half an hour, then in the refrigerator for another hour. The crystals, washed with Skellysolve A and dried in the air, weighed 6.0 g.; M. P. 76–77.5°. A second Skellysolve D addition followed by standing overnight gave a crop which was slightly yellow; 3.28 g. Recrystallized from ether and Skellysolve, 1.63 g.; M. P. 77–77.5°. The total, 7.63 g., represents a 43% yield of purified ester. For assay 12.73 mg. was dissolved in 5 ml. ethanol and diluted to 100 ml. with neutral buffer; iodometric, 1210 units/mg. Theory=1410; *S. aureus* 43 units/mg., ratio subtilis/staph., 0.39. The latter figure is sufficiently shifted from the 1.0 value to be expected of sodium penicillin G to indicate at least a part of the bacteriostatic activity was due to the ester per se.

Analysis: Calculated for $C_{20}H_{24}N_2O_6S$

|   | Calculated | Found |
|---|---|---|
| C | 57.1 | 57.2 |
| H | 5.75 | 5.82 |

*Example 7.—Penicillin methoxymethyl ester:*

Pen COONa + ClCH$_2$OCH$_3$ → Pen COOCH$_2$OCH$_3$

A cold solution containing 1 g. sodium penicillin G in 10 ml. acetyldimethylamine was treated with 0.3 ml. chloromethyl ether and allowed to stand in the refrigerator overnight. Addition of the reaction solution to 100 ml. buffer produced a gummy precipitate which was extracted with 50 ml. chloroform. The chloroform solution was washed with 25 ml. neutral buffer and then 25 ml. water to free it of any unreacted penicillin. Assays on 230 ml. aqueous solution prepared from 1 ml. of the chloroform solution showed 681,000 units iodometrically and 510,000 units on *S. aureus* plates. Evaporation of the chloroform solution gave a slightly yellow oil, which was dried in a high vacuum; yield 0.47 g. (46%).

To make certain of the absence of free penicillin it was again dissolved in 50 ml. chloroform, washed with 50 ml. neutral buffer, then 50 ml. water. An aqueous solution (30 ml.) prepared from 1 ml. of the chloroform solution showed the total solution still to contain 190,000 units, corresponding to 405 units/mg. for the ester (theory=1760).

A suitable solvent for the reaction by which the esters of this invention are formed must, in addition to its solvent qualities, be indifferent toward penicillin, the alkyl halide used in the reaction, and the ester formed by the reaction, all of which are relatively reactive compounds. In addition to possessing these qualities, it is advantageous that the solvent be miscible with water in order to facilitate isolation and purification of the product. Acetyldimethylamine and dimethylformamide have been found especially suitable. The reaction of a penicillin salt with the alkyl halide proceeds smoothly in these solvents and produces high yields of the desired esters. These can readily be isolated as crystalline solids by simple dilution with buffer or water, in which the majority of the desired esters are almost insoluble. The simplicity and economy, and also the wide applicability, of these operations present strong contrasts with the conditions and limitations of the diazomethane method used for the preparation of the penicillin esters previously known.

The esters of the present invention contain groupings which labilize the ester linkage, and, in contact with blood or other aqueous fluids, they release active penicillin at marked rates through saponification. Furthermore, these rates are subject to very wide variation in different esters. As an example of this, the relative rates of hydrolysis or saponification of several such esters in a buffered aqueous acetone solution were found to be as follows:

| Penicillin Ester | Relative Rate of Hydrolysis |
|---|---|
| Carbethoxymethyl | 1 |
| Penacyl | 2.6 |
| para-Phenylphenacyl | 3.0 |
| Carboxamidomethyl | 4.3 |
| Acetonyl (CH$_3$—CO—CH$_2$—) | 10.4 |

These rates fall within the range desired for therapeutic usefulness. Thus, at the pH of blood (approximately 7.35) and at body temperature (37° C.), the rate of saponification of the acetonyl ester corresponds to 50% hydrolysis (to active penicillin) in 75 minutes.

One of the characteristics of esters of the present invention which contributes to their usefulness is their low rate of solution in aqueous fluids. This property, like the rate of hydrolysis, is also variable, and, by selection of members having the proper rates of solution and hydrolysis, therapeutically valuable repository products may be obtained. Thus, upon intramuscular injection of an aqueous suspension of such an ester, a process of slow solution and hydrolysis by body fluids is initiated, resulting in the prolonged maintenance of therapeutic concentrations of penicillin in the blood.

Another property of many of the new esters which is important for oral penicillin preparations is their freedom from the bitter taste which characterizes penicillin salt.

Still another useful property of the new esters is their resistance to the action of penicillinase, an enzyme highly destructive to penicillin and present in a substantial proportion of wound and other infections as well as in the normal intestinal tract.

In addition to the above useful properties of the penicillin esters of this invention, these esters also provide a means for protecting the carboxyl group of penicillin through a series of chemical transformations, and for allowing subsequent regeneration of the carboxyl group upon hydrolysis. Hence, these compounds are valuable as intermediates.

We claim:

1. A new class of compounds of the general formula $$\text{Pen COO—CH}_2\text{—CO—R}$$

where R is a member selected from the group consisting of amino, (lower) alkylamino, di-(lower) alkylamino, and (lower) alkoxy and where Pen COO represents a penicillin with the hydrogen atom removed from the carboxyl group.

2. Penicillin carboxamidomethyl ester.
3. Penicillin carbethoxymethyl ester.

HAROLD F. McDUFFIE, Jr.
DOUGLAS E. COOPER.

References Cited in the file of this patent

UNITED STATES PATENTS

| Number | Name | Date |
|---|---|---|
| 2,578,570 | McDuffie et al. | Dec. 11, 1951 |

OTHER REFERENCES

Carpenter "J. Am. Chem. Soc." vol. 70, Sept. 1948, p. 2966.